3,480,302
INTERNAL LOCK RING BELL AND SPIGOT JOINT
Warren C. Jeffery and Sidney P. Teague, Birmingham, Ala., assignors to McWane Cast Iron Pipe Company, Birmingham, Ala., a corporation of Delaware
Filed Feb. 24, 1966, Ser. No. 529,775
Int. Cl. F16l 19/00, 17/00, 23/00
U.S. Cl. 285—362                                    10 Claims

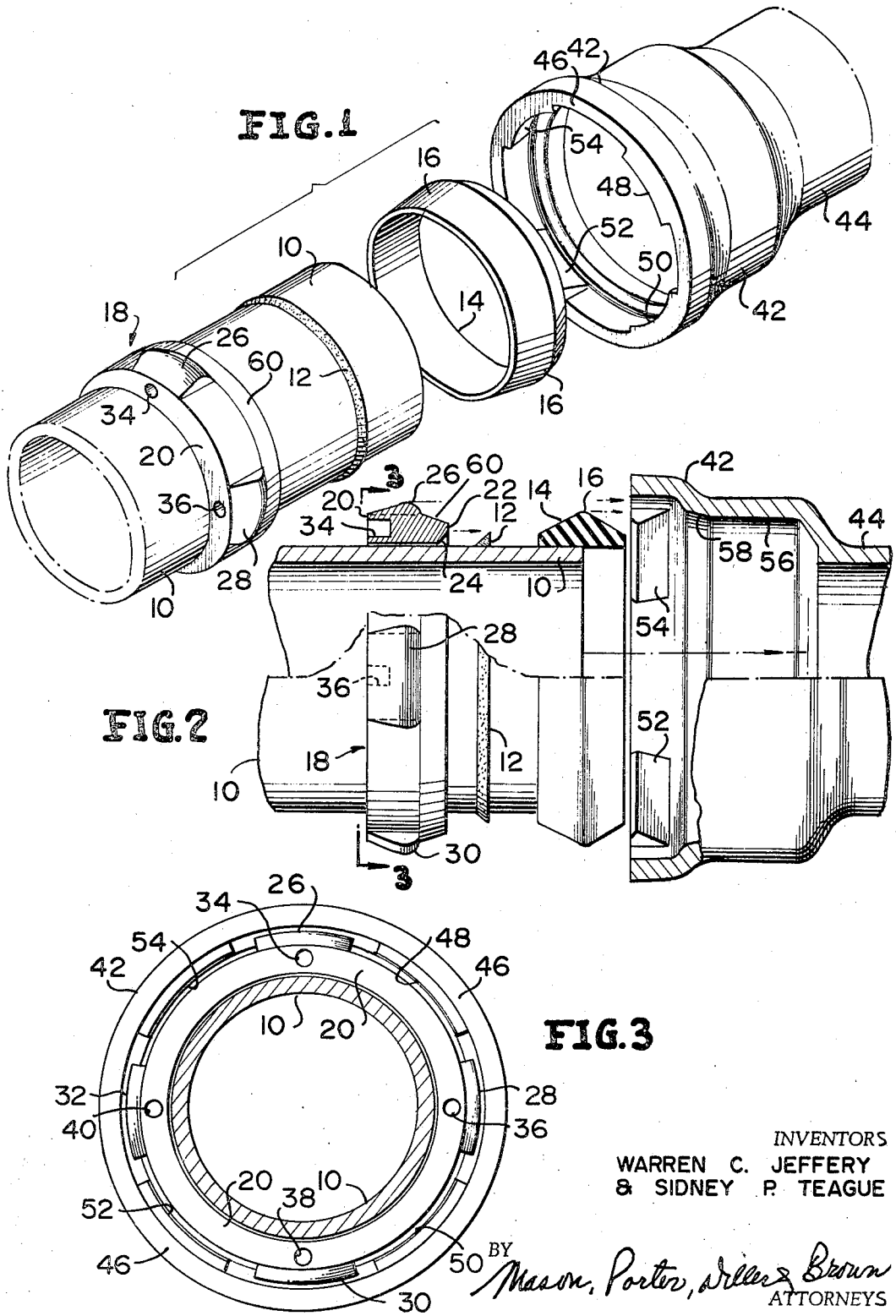

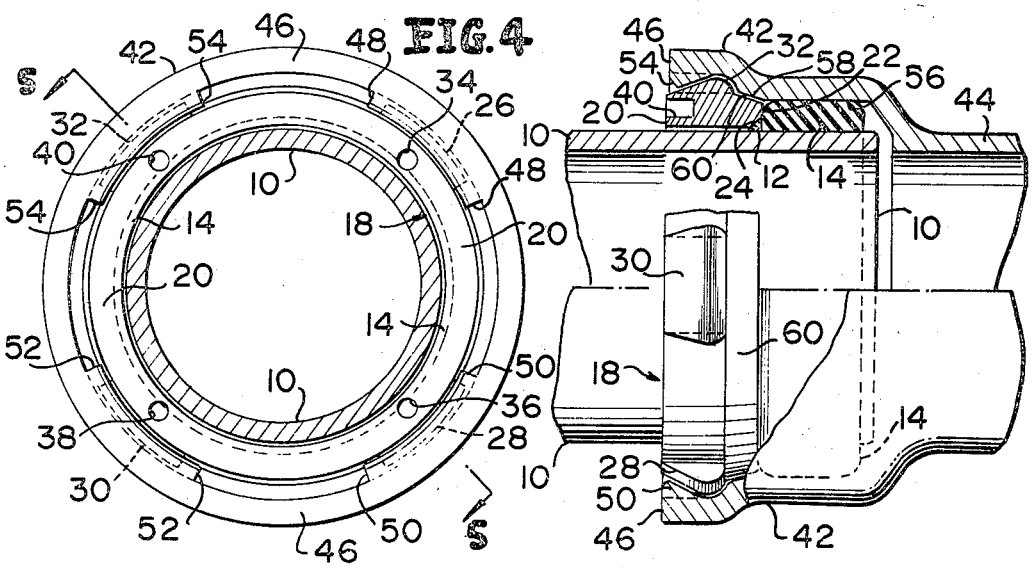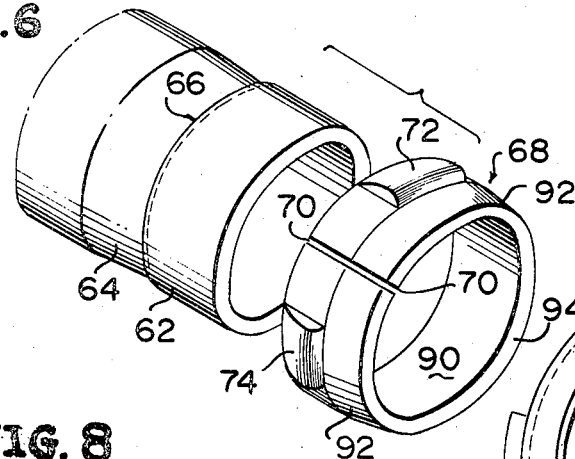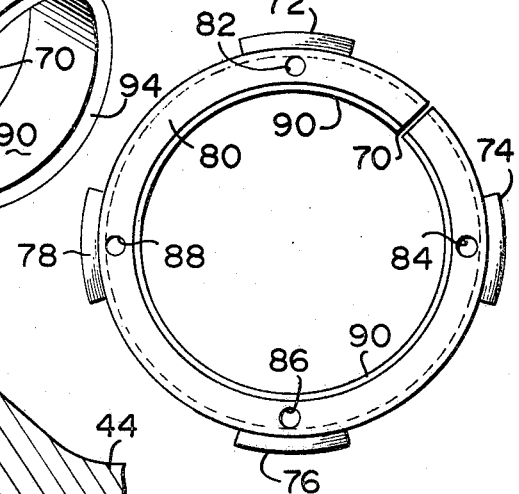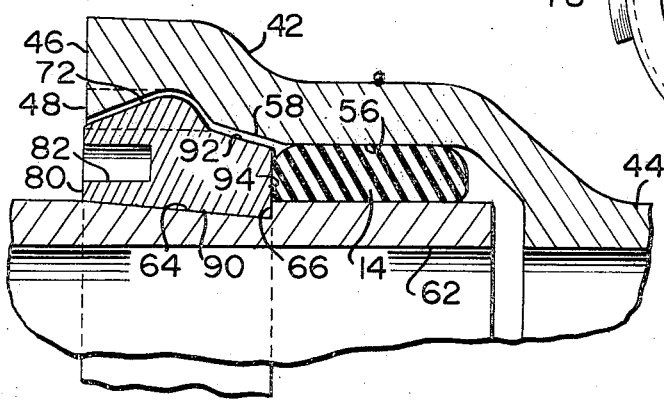
INVENTORS
WARREN C. JEFFERY
& SIDNEY P. TEAGUE United States Patent Office 3,480,302
Patented Nov. 25, 1969

ABSTRACT OF THE DISCLOSURE

This disclosure relates to a pipe joint comprised of a bell and spigot wherein a seal is effected therebetween by an annular resilient sealing member, the bell including a plurality of inwardly directed lugs formed adjacent a front end opening of the bell, locking ring means carried by the spigot for interlockingly engaging the bell lugs with the sealing member being constrained against axial movement by the locking ring means, the locking ring means being an annular locking ring having a split to permit deflection thereof for in-field assembly thereof within a peripheral groove of the spigot.

---

In summary the invention is directed to a pipe joint of the type heretofore described in which the bell and spigot can be rapidly and easily field assembled by simply positioning a split locking ring upon a terminal end of the spigot prior to the insertion of the latter and an annular sealing member carried thereby into the bell. The split ring also carries locking lugs to effect an interlock between the bell and spigot by simply rotating the split ring. The split ring is further received in a peripheral groove of the spigot to accurately limit the extent of introduction of the spigot into the bell. The split ring need not necessarily be split, and in lieu thereof, the spigot is provided with a weld bead against which an unsplit locking ring may abut for again limiting the introduction of the spigot into the bell and interlocking the latter components to each other by rotating the locking ring.

The present invention is primarily useful as a joint or coupling for joining pipe members employed in the transmission of fluids such as water, gas, etc. The pipe may be of cast iron, ductile cast iron, steel, etc. or even of non-metallic composition.

If one were to casually observe a section of pressure pipe in a trench, he may conclude that the pipe joint or coupling joining similar sections of pipe has changed little, if any, in the past 175 years. However, a more thorough analysis will prove the conclusion erroneous since there has evolved a substantially steady improvement in the art of joining sections of pipe. For example, the oldest form of joint or cast iron pressure pipe was made by threading the pipe on each end and screwing a flange over the threaded sections. A joint was then effected by positioning a gasket between the flanges of adjacent sections of pipe to be joined. Bolts were usually employed to couple the flanges together.

Although the foregoing manner of joining pipe sections is still practiced, later on the bell and spigot joint received general acceptance and to this day, still retains some of its previous popularity. The seal between the early bell and spigot joints was effected by the positioning of jute and lead in the area between the inserted spigot and the bell. Of course, other materials were employed to provide the seal. Later, a mechanical joint in the form of a bell and spigot construction appeared wherein a flange was cast on the end of the bell. A gland was bolted to the flange holding a gasket against the spigot to effect the seal.

Perhaps the latest type of construction is the slip-in or roll-on joint wherein a spigot is inserted into a bell, the seal being effected by an annular-resilient sealing member usually of rubber or a plastic composition. In the slip-on type of joint, the annular sealing member is positioned within a recess formed about the inner surface of the bell. In the roll-on type of joint, the annular sealing member is placed on the end of the spigot and as the spigot is inserted into the bell socket, the sealing member rolls to the proper assembly position.

The foregoing pipe joints or couplings and modifications of these joints, although possessing certain desirable qualities, did not meet the requirements of a truly successful pipe joint. For example, although the joint provided a good seal at operating pressures and was resistant to separation, the assembled joint did not provide for deflection of adjacent pipe sections. Further, machining of the joint may have been required so as to effect a positive seal. In addition, the joint may be expensive to assemble and require the employment of skilled workmen to form the joint. Furthermore, the life of the pipe joint may be limited by the corrosion of the bolts employed to connect the flanges of the joint. Also, the joint may have been severely limited in the pressure to which it could be successfully subjected without bursting.

Accordingly, a truly successful pipe joint or coupling would be simple in construction and economical to manufacture; be suitable for use "as cast" over the range of tolerances encountered in manufacturing procedures; be capable of being assembled under adverse conditions such as a wet or small trench, etc.; be easy to assemble with simple tools and a minimum amount of relatively unskilled labor; must provide assurance that the annular, resilient sealing member remains in proper sealing position during assembly; be flexible within limits so as to not impart rigidity to the pipe line; be resistant to separation due to internal pressure; be pressure-tight against both internal and external pressure under all service conditions; and, have a life expectancy under field conditions equal to that of the pipe line itself.

Accordingly, it is the principal object of the present invention to improve pipe joints and couplings.

It is a further object of the present invention to improve pipe joints and couplings of the bell and spigot type.

It is a further object of the present invention to provide a joint which is capable of sustaining high internal pressure and which is pressure-tight against external pressure.

It is a further object of the present inevntion to provide a pipe joint which is simple in construction, econominal to manufacture, and easy to assemble with simple tools and by unskilled employees.

It is a further object of the present invention to provide a pipe joint of the bell and spigot type which is usable "as cast" for effecting a seal by an intervening resilient, annular sealing member which sealing member will remain in proper sealing position during assembly.

It is a further object of the present invention to provide a pipe joint which is flexible so as to not impart rigidity to the pipe line and which has a long life expectancy when subjected to an earthen environment.

It is a still further object of the present invention to provide a pipe joint which may be assembled under adverse conditions and which is resilient to separation due to high internal pressures.

These and other objects of the present invention are accomplished by providing a bell having a plurality of inwardly directed lugs formed adjacent the front end opening of the bell. An inner surface of the bell is adapted to receive the periphery of an annular, elastomeric sealing member which surrounds a spigot and engages the inner area of the bell. A ring or collar having a plurality of spaced, locking lugs extending therefrom includes a boss which engages a circumferential bead formed on the periphery of the spigot. The locking lugs of the ring mate with and engage the lugs of the bell. The circumferential bead may be formed by welding and is selectively positioned so as to provide an area on the periphery of the spigot for the annular sealing member as well as to engage the front end surface of the ring for effecting a positive lock between the spigot and bell.

In another embodiment of the invention, a circumferential groove is formed on the spigot in place of the weld bead, the groove providing an abutment which is engaged by a split ring. The split ring is formed with a plurality of substantially identical locking lugs and when slipped over the spigot to the circumferential groove, the front end surface of the split ring will form a lock due to its engagement with the abutment caused by the circumferential groove. In both embodiments, a plurality of spanner wrench receiving sockets are axially positioned in the rear end surface of the ring so as to permit the insertion of a spanner wrench and thereby position the lugs of the bell and the ring in locking engagement.

The invention both as to its organization and method of operation together with further objects and advantages thereof will best be understood by reference to the following specification taken in conjunction with the accompanying drawings, in which:

FIGURE 1 is an exploded prespective view illustrating a spigot, a locking ring positioned about the spigot, an annular sealing member and a bell having a plurality of inwardly directed locking lugs formed thereon;

FIGURE 2 is a side elevational view partly in vertical longitudinal section and illustrating the elements of the FIGURE 1 in a partial state of assembly;

FIGURE 3 is a vertical sectional view taken along the line 3—3 of the FIGURE 2 with the locking ring shown in position for entering the bell;

FIGURE 4 is a vertical cross-sectional view similar to the FIGURE 3 and showing the locking ring rotated to its coupling or locking position;

FIGURE 5 is a side elevational view taken along the line 5—5 of the FIGURE 4 and illustrating the completed coupling, parts being broken away and shown in section;

FIGURE 6 is a modified form of the invention and illustrating a split locking ring and a circumferential recess about the spigot which provides a locking position for the split ring;

FIGURE 7 is an end elevational view of the split locking ring shown in the FIGURE 6; and FIGURE 8 is a fragmentary sectional view of the modified form of the invention employing the spigot and split locking ring of the FIGURES 6 and 7.

With reference to the FIGURE 1, a spigot 10 has a circumferential bead 12 formed about its periphery and spaced from the end of the spigot 10 which is inserted within an elastomeric, annular sealing member 14. The sealing mmeber 14 includes a pair of external surfaces which converge at an apex 16 having the form of a V.

Loosely positioned about the spigot 10 is a ring 18 having a rear end surface 20 which is substantially perpendicular to the longitudinal axis of the spigot 10. Further, the ring 18 includes a front end surface 22, best illustrated in the FIGURE 2, the front end surface 22 being undercut at 24 so as to receive the circumferential bead 12 when the ring 18 is moved into locking position against the bead 12. Projecting from the periphery of the ring 18 and outwardly directed are a plurality of locking lugs 26, 28, 30 and 32, the locking lugs 30 and 32 being illustrated in the FIGURE 3. Although four locking lugs 26, 28, 30 and 32 are illustrated, it will be readily understood by those skilled in the art that a lesser or greater number of locking lugs may be employed according to one's needs or as found convenient. To facilitate the rotation of the ring 18 upon subsequent assembly of the pipe joint, a plurality of spanner wrench receiving sockets 34, 36, 38 and 40, the sockets 38 and 40 being visible in the FIGURES 3 and 4, are formed in the rear end surface 20 of the ring 18, the axis of the sockets 34, 36, 38 and 40 being substantially parallel to the longitudinal axis of the ring 18. For convenience, the spanner wrench receiving sockets 34, 36, 38 and 40 are generally equally spaced about the rear end surface 20 although such is not required or necessary. The requirement is that the spanner wrench receiving sockets 34, 36, 38 and 40 be so positioned so as to permit the insertion of a spanner wrench projection, not shown, so as to accommodate the subsequent assembly operation. Also, although the locking lugs 26, 28, 30 and 32 are shown as being substantially equally spaced about the periphery of the locking rings 18, it will be readily understood that these too may be positioned in a manner other than equally spaced, the requirement being that the locking lugs conform and cooperate with a plurality of inwardly directed locking lugs formed on a bell, to be hereinafter described.

With continued reference to the FIGURE 1, a bell 42 is integrally formed to a spigot 44. The bell 42 has a front end surface 46 lying in a plane substantially perpendicular to the longituidinal axis of the bell 42 and the spigot 44 and supports a plurality of inwardly directed lugs 48, 50, 52 and 54. Although four such lugs are shown and are illustrated as being equally spaced, it will be readily understood by those skilled in the art that a lesser or greater number may be employed and the spacing varied according to one's needs or requirements.

The invention is further described with reference to the FIGURE 2 which illustrates a side elevational view partly in vertical longitudinal section and illustrating the parts of the FIGURE 1 in a partial state of assembly. More specifically, the annular sealing member 14 is partially positioned over the end of the spigot 10, the spigot 10 being aligned to enter the bell 42. The ring 18 is shown spaced away from the circumferential bead 12 a sufficient distance so that the apex 16 of the sealing member 14 is positioned and engages an internal sealing member surface 56 within the bell 42. After the spigot 10 is inserted into the bell 42 with the sealing member 14 tightly engaging the surface 56, the ring 18 would be positioned, the procedure for positioning the ring 18 to be described hereinafter. Between the area supporting the lugs 48, 50, 52 and 54 and the surface 56 is a flared surface 58 which accommodates and is in spatial relation to a tapered surface 60 of the ring 18 when the ring is positioned within the bell 42 in its locking position.

The FIGURE 3 is a vertical cross-sectional view taken along the line 3—3 of the FIGURE 2 and illustrates the locking lugs 26, 28, 30 and 32 of the ring 18 aligned with the areas between the lugs 48, 50, 52 and 54 of the bell 42. The spanner wrench receiving sockets 34, 36, 38 and 40 are clearly visible on the rear end surface 20 of the ring 18 and when engaged by a spanner wrench having the appropriately spaced projections to engage the sockets, the ring 18 may be rotated to the position shown in the FIGURE 4.

The FIGURE 4 is a view similar to the FIGURE 3 but illustrating the ring 18 rotated to its locking position. In its locking position, the locking lugs of the ring 18 are rotated so as to engage the lugs of the bell 42.

More specifically, with reference to the FIGURES 4 and 5 it will be observed that the ring 18 has been rotated approximately 45 degrees in a clockwise direction, although locking may also be achieved by a similar rotational movement in a counterclockwise direction, so that the locking lug 26 of the ring 18 is positioned in locking engagement behind the lug 48 of the bell 42; the locking lug 28 of the ring 18 has been positioned behind and in locking engagement with the lug 50 of the bell 42; the locking lug 30 of the ring 18 has been positioned behind and in locking engagement with the lug 52 of the ring 42; and, the locking lug 32 on the ring 18 has been positioned behind and in locking engagement with the lug 54 of the bell 42. The rotation of the ring 18 is accomplished, of course, by the insertion of a spanner wrench, not shown, into two or more of the spanner wrench receiving sockets 34, 36, 38 and 40 and applying a rotational force to the wrench so that the locking lugs 26, 28, 30 and 32 are eased into locking engagement with the lugs 48, 50, 52 and 54 depending from the front end surface 46 of the bell 42.

In the assembled position shown in the FIGURE 5, the annular sealing member 14 has been deformed so that a high pressure seal is effected between the periphery of the spigot 10 and the sealing member surface 56 internally of the bell 42. Further, it will be observed that the undercut 24 of the ring 18 is in engagement with the bead 12 and through the cooperation of the locking lugs 26, 28, 30 and 32 of the ring 18 and the lugs 48, 50, 52 and 54 of the bell 42, the spigot 10 is prevented from being forced or "blown-out" of the bell 42 due to the application of pressures internally of the pipe sections which are within design specifications. In the assembled configuration set forth in the FIGURE 5, the tapered surface 60 of the ring 18 which is formed between the lugs and the front end surface 22 is in substantially uniform spatial relationship to the flared surface 58 formed internally of the bell 42. The joint is easily disassembled by rotation of the ring 18 with a spanner wrench in the manner set forth so that the locking lugs 26, 28, 30 and 32 are positioned between the lugs 48, 50, 52 and 54 of the bell 42. In this position, the ring 18 may be conveniently retracted so that separation of the spigot 10 from the bell 42 is easily accomplished.

The FIGURES 6, 7 and 8 illustrate a further embodiment of the invention wherein a split ring is substituted for the continuous ring of the earlier figures and a recess is provided on the periphery of the spigot to engage the ring which is in lieu of the bead previously illustrated. As shown in the FIGURE 6, a spigot 62 has provided about its periphery a tapering groove 64 which provides an abutment shoulder 66. A split ring 68 is generally similar to the ring 18 of the earlier figures except that the ring 68 is separated as indicated at 70. As best illustrated in the FIGURE 7, a plurality of outwardly directed locking lugs 72, 74, 76 and 78 project from the periphery of the split ring 68. The rear end surface 80 is provided with a plurality of axially aligned, spanner wrench receiving sockets 82, 84, 86 and 88, as shown. The internal circumference of the split ring 68 is formed with a taper as indicated at 90.

With reference again to the FIGURE 6, the split ring 68 is provided with a peripheral tapered surface 92 which is similar to the tapered surface 60 of the ring 18 of the earlier figures. The front end surface 94 is substantially perpendicular to the longitudinal axis of the ring 68.

The final assembly of the pipe joint is illustrated in the FIGURE 8. The bell of the FIGURE 8 is substantially identical to the bell 42 of the earlier figures and is so identified. A spigot 44 is integrally formed to the bell 42. The bell 42 has a front end surface 46 which has projecting inwardly therefrom, a plurality of lugs such as the lug 48 which is substantially identical to the same lug of the earlier figures. To form the assembled joint of the FIGURE 8, the split ring 68 is urged over the spigot 62 and due to the separation 70, the ring 68 will expand circumferentially so as to permit the ring 68 to be slipped over the spigot 62 until the taper 90 mates with the tapering groove 64 and the front end surface 94 falls into the notch adjacent the abutment shoulder 66. With the front end surface 94 in engagement with the abutment shoulder 66, the split ring 68 is securely locked into position with the locking lugs, such as the lugs 72, in engagement with and locked against the lugs, such as the lug 48, of the bell 42. The annular sealing member 14 fits snugly against the sealing member surface 56 internally of the bell 42 and provides a high pressure seal. Through the cooperation of the locking lugs of the bell 42 and the split ring 68 and the abutment shoulder 66, the joint is securely locked and remains so until the split ring 68 is rotated to its non-locking position.

Thus, there has been described a pipe joint or coupling incorporating a ring which surrounds a spigot and in locking engagement therewith. A plurality of locking lugs project from the ring. After the ring is positioned over the spigot, a bead is formed about the periphery of the spigot and at a distance from the end of the spigot which is less than the "depth" of the bell. The bead may be formed in any convenient manner, such as by welding. Next, an elastomeric sealing member such as an "O-ring" is positioned on the spigot and the spigot and sealing member are inserted into a bell, the bell having a plurality of inwardly directed lugs which mate with the outwardly projecting lugs of the ring when the joint is in the locked configuration.

With the spigot now inserted into the bell, the ring surrounding the spigot is advanced toward the bell with the projecting lugs of the ring passing through the areas between the lugs of the bell. Thereafter, a spanner wrench is employed to engage a plurality of spanner receiving sockets to rotate the ring so that the lugs of the ring and the lugs of the bell are aligned or in face-to-face relationship. The pipe joint is now locked and resists separation upon the application of design pressures.

In a further embodiment, a tapered groove and abutment shoulder is formed about the periphery of the spigot and replaces the bead of the earlier embodiment. The surrounding ring in this configuration is split so that the ring may be readily slipped over the projecting spigot and locked into place by engagement of the front end surface of the ring with the abutment shoulder provided on the spigot. The assembly of the later embodiment is substantially identical to the earlier embodiment.

The foregoing pipe coupling when in its locked configuration provides a high resistance to separation and due to the superior seal effected by the elastomeric sealing member, high pressures may be maintained within the pipe members. Some deflection of adjacent pipe sections is permitted and the pipe joint may be assembled by unskilled labor. Further, no machining of the sealing surfaces is necessary and the life of the joint is substantially that of the pipe line. The pipe members may be of cast iron or may be of ductile cast iron such as that set forth in the U.S. patent to Millis et al. 2,485,760. Although the invention has been illustrated and described with four inwardly and four outwardly projecting lugs, it will be readily understood by those skilled in the art that a greater or lesser number may be employed as found convenient. Further, it will be readily understood that the elastomeric, annular sealing member may take a configuration other than that shown in the figures.

Thus, the present invention may be embodied in other specific forms without departing from the spirit and the essential characteristics of the invention. The present embodiment is, therefore, to be considered in all respects as illustrative.

What is claimed is:

1. A pipe joint comprising a bell and a spigot, said bell having a peripheral terminal end portion of a predetermined internal diameter, said bell further including another peripheral portion inboard of said terminal end portion, said inboard peripheral portion being of a lesser internal diameter than said first-mentioned diameter, said spigot having an end portion received within said bell, an annular resilient sealing member surrounding said spigot end portion and being in sealing engagement with the said another peripheral portion, said sealing member in its uncompressed condition including a pair of radially outwardly directed converging surfaces merging at an apex portion thereby imparting a generally V-shaped exterior surface configuration to said sealing member, the maximum external diameter of said sealing member in its uncompressed condition being greater than the diameter of said another peripheral portion, said bell being devoid of the conventionally radially inwardly directed throat flange whereby said pipe joint can be field assembled without beveling the spigot by first positioning the sealing member in external surrounding relationship to the spigot end portion prior to the introduction thereof into the bell, said terminal end portion including a plurality of radially inwardly directed circumferentially spaced locking lugs, a locking ring surrounding said spigot end portion, said locking ring having a plurality of radially outwardly directed circumferentially spaced locking lugs in engagement with the locking lugs of said bell, said spigot end portion having a terminal end, means carried by said spigot end portion contacting said locking ring for limiting axial movement of said locking ring towards said spigot terminal end, said limiting means being a groove formed in an exterior surface of said spigot end portion defining a shoulder facing away from said spigot terminal end, and said locking ring is in abutment with said shoulder.

2. A pipe joint of the bell and spigot type wherein a seal is effected between the bell and spigot by an annular resilient sealing member, the improvement comprising a plurality of inwardly directed lugs formed adjacent a front end opening of said bell, locking ring means carried by said spigot for interlockingly engaging said bell lugs to form a lock between said spigot and said bell with said sealing member being constrained against axial movement outwardly of said bell by a peripheral surface of said locking ring means immediately adjacent and opposing said sealing member, said locking ring means is an annular locking ring having a split to permit deflection thereof, a peripheral groove formed in an exterior surface of said spigot, said locking ring being positioned in said groove, and the split in said locking ring being effective for permitting said locking ring to be deflected to position the latter in said groove by sliding movement of the locking ring upon the spigot in a direction towards said bell.

3. A pipe joint of the bell and spigot type wherein a seal is effected between the bell and spigot by an annular resilient sealing member comprising a plurality of inwardly directed lugs formed adjacent a front end opening of said bell, means for engaging said spigot and for cooperating wtih said lugs to form a lock between said spigot and said bell, said means for engaging said spigot and for cooperating with said lugs including split ring means surrounding said spigot and a circumferential groove formed on said spigot providing an abutment engageable by said split ring means, and said split ring means includes a plurality of locking lug means extending outwardly therefrom for engaging said bell lugs upon relative rotation of said spigot relative to said bell.

4. The pipe joint as defined in claim 3 wherein said split ring means includes an innermost peripheral surface directly opposing said sealing member and preventing axial movement of the latter in a direction beyond said split ring means.

5. The pipe joint as defined in claim 3 wherein said sealing member in its uncompressed condition includes a pair of radially outwardly directed converging surfaces merging at an apex portion thereby imparting a generally V-shaped exterior surface configuration to said sealing member.

6. A pipe joint comprising a bell and a spigot, said bell having a peripheral terminal end portion of a predetermined internal diameter, said bell further including another peripheral portion inboard of said terminal end portion, said inboard peripheral portion being of a lesser internal diameter than said first-mentioned diameter, said spigot having an end portion received within said bell, an annular resilient sealing member surrounding said spigot end portion and being in sealing engagement with said another peripheral portion, said sealing member in its uncompressed condition having an external diameter greater than the diameter of said another peripheral portion, said bell being devoid of the conventionally radially inwardly directed throat flange whereby said pipe joint can be field assembled without beveling the spigot by first positioning the sealing member in external surrounding relationship to the spigot end portion prior to the introduction thereof into the bell, said spigot end portion having a terminal end, means inboard of said terminal end projecting radially beyond an exterior surface of said spigot end portion for limiting axial movement of said sealing member in a direction away from said terminal end, said limiting means being defined by a circumferential shoulder surrounding said spigot end portion immediately adjacent said sealing member, an annular locking ring positioned wholly to one side of said circumferential shoulder opposite said sealing member, said terminal end portion includes a plurality of radially inwardly directed circumferentially spaced locking lugs, said locking ring having a plurality of radially outwardly directed circumferentially spaced locking lugs in engagement with the locking lugs of said bell, and said locking ring being positioned internally of said bell with the locking lugs of said locking ring being in direct engagement with the locking lugs of said bell.

7. The pipe joint as defined in claim 6 wherein said locking ring is freely rotatably and axially slidably carried by said spigot end portion.

8. The pipe joint as defined in claim 6 wherein said circumferential shoulder is a circumferential weld bead.

9. The pipe joint as defined in claim 6 wherein said sealing member in its uncompressed condition includes a pair of radially outwardly directed converging surfaces merging at apex portion thereby imparting a generally V-shaped exterior surface configuration to said sealing member.

10. The pipe joint as definde in claim 6 wherein said locking ring is freely rotatable and axially slidably carried by said spigot end portion, said circumferential shoulder is a weld bead, and said sealing member in its uncompressed condition includes a pair of radially outwardly directed converging surfaces merging at an apex portion thereby imparting a generally V-shaped exterior surface configuration to said sealing member.

References Cited

UNITED STATES PATENTS

| | | | |
|---|---|---|---|
| 239,827 | 4/1881 | Newman | 285—321 |
| 1,939,936 | 12/1933 | Walker et al. | 285—412 |
| 2,684,860 | 7/1954 | Rafferty | 285—376 |
| 2,926,701 | 3/1960 | Campbell | 285—39 |
| 3,273,919 | 9/1966 | Billeter et al. | 285—374 |
| 1,830,973 | 11/1931 | Wheaton | 285—377 X |
| 2,205,910 | 6/1940 | Raybould. | |
| 3,257,719 | 6/1966 | Larkfeldt | 285—344 X |

FOREIGN PATENTS

| | | |
|---|---|---|
| 19,640 | 11/1900 | England. |
| 553,325 | 12/1956 | Belgium. |
| 448,328 | 11/1912 | France. |
| 901,755 | 11/1944 | France. |

REINALDO P. MACHADO, Primary Examiner

WAYNE L. SHEDD, Assistant Examiner

U.S. Cl. X.R.

285—400, 414